United States Patent [19]

Rake et al.

[11] Patent Number: 4,639,853
[45] Date of Patent: Jan. 27, 1987

[54] TIME-DISCRETE ADAPTIVE SWITCHING ON-OFF CONTROLLER

[75] Inventors: Heinrich Rake; Ulrich Hoffmann; Ulrich Müller; Rudolf Breddermann, all of Aachen; Rainer Blumbach, Würselen, all of Fed. Rep. of Germany

[73] Assignee: Omron Tateisi Electronics Co., Kyoto, Japan

[21] Appl. No.: 616,196

[22] Filed: Jun. 1, 1984

[30] Foreign Application Priority Data

Jun. 3, 1983 [DE] Fed. Rep. of Germany ....... 3320224

[51] Int. Cl.⁴ ..................... G05B 13/04; G05B 13/02; G05B 13/00; G05B 21/02
[52] U.S. Cl. .................................. 364/149; 364/151; 364/162; 364/150; 364/200; 318/636
[58] Field of Search ............... 364/148, 149, 150, 151, 364/160, 161, 162, 163, 200, 900, 141; 318/594, 600, 601, 636, 592

[56] References Cited

U.S. PATENT DOCUMENTS

| | | | |
|---|---|---|---|
| 3,601,588 | 8/1971 | Bristol, II | 364/151 |
| 4,213,175 | 7/1980 | Kunhara | 364/151 X |
| 4,214,301 | 7/1980 | Kunhara et al. | 364/150 X |
| 4,232,364 | 11/1980 | Bibbevo | 364/162 X |
| 4,437,045 | 3/1984 | Mitsuoka | 364/150 X |
| 4,479,176 | 10/1984 | Grimshaw | 364/148 |

FOREIGN PATENT DOCUMENTS

| | | |
|---|---|---|
| 0037579 | 10/1981 | European Pat. Off. |
| 0077685 | 4/1983 | European Pat. Off. |

OTHER PUBLICATIONS

Proceedings of the 7th Triennial World Congress of the International Congress of the International Federation of Automatic Control, 12th–16th, Jun. 1978, Helsinki, Finland, vol. 1, pp. 443–452, Pergamon Press, Oxford, GB, H. Kurz, et al.: "Development, Comparison and Application of Various Parameter-Adaptive Digital Control Algorithms", * p. 446, FIG. 2*.

Proceedings of the 8th Triennial World Congress of the International Federation of Automatic Control, 24th–28th, Aug. 1981, Kyoto, Japan, vol. 2, pp. 1081–1086, Pergamon Press, Oxford, GB; U. Hoffmann, et al.: "On the Combination of Parameter Estimation and Predictive On-Off Control" * p. 1082, FIG. 2*.

Breddermann, R.: Realization and Application of a Selftuning On-Off Controller, Proceedings of the International Symposium on Adaptive Systems, Bochum, FRG, 1980, and Hoffmann, U.

*Primary Examiner*—Jerry Smith
*Assistant Examiner*—Jon D. Grossman
*Attorney, Agent, or Firm*—Stevens, Davis, Miller & Mosher

[57] ABSTRACT

The present invention relates to an arrangement for the discrete-time adaptive on-off switching control of a continuous-time process with a binary switching actuator, which uses for the determination of the on-off actuating signal a prediction of a process output sequence over several future sampling intervals as reaction to a possible process input sequence that is applied to a discrete-time linear process model and which estimates and updates in every sampling interval the parameters of the process model by means of a parameter estimation device in order to adapt them to the process to be controlled, even when the process behavior changes, and which has a device for the input and change of the setpoint, the limits of the process output and the sampling time as well as a measuring device for the periodical measurement of the process input. The arrangement further comprises two alternatively working control devices one of which is active in the stationary phase and the other of which is active in the start-up phase of the process or after setpoint changes, and a switching device which activates one or the other said control device in dependence of the result of the measurement of the process output and of input current setpoint, wherein the actuator is served by the active control device.

15 Claims, 13 Drawing Figures

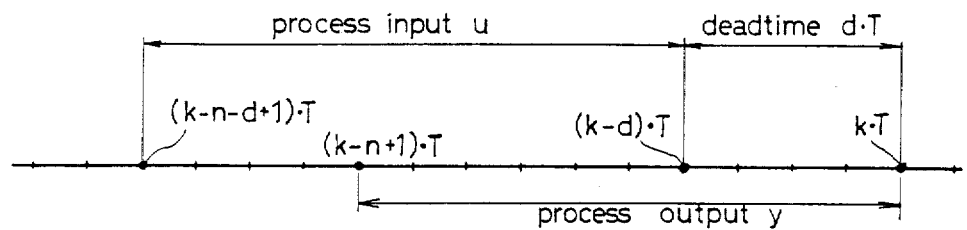
FIG. 2a
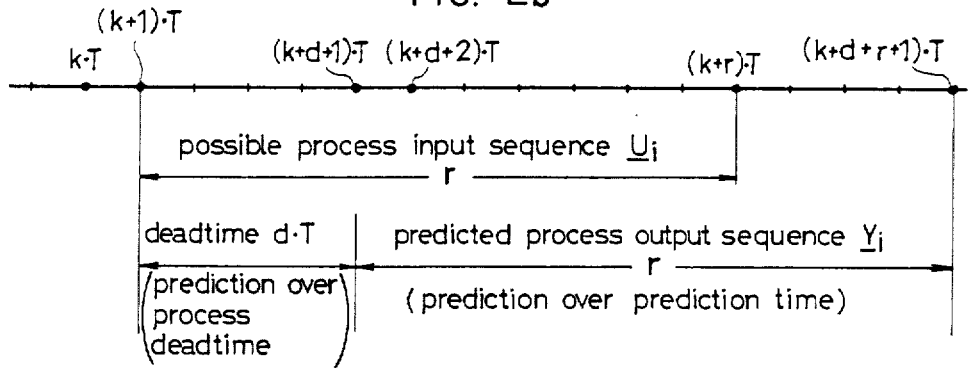
FIG. 2b
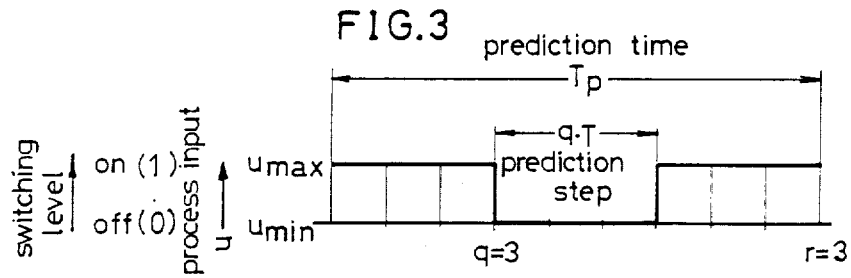
FIG. 3
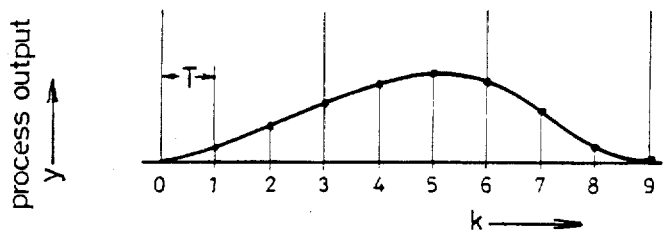

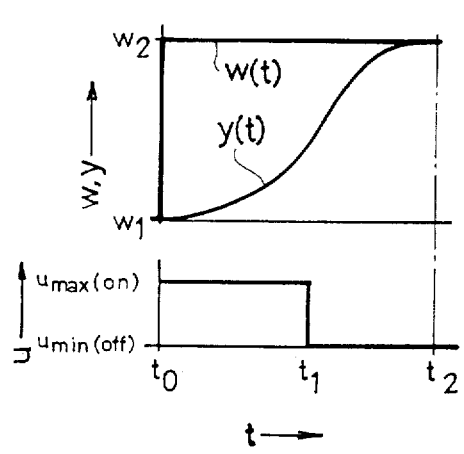
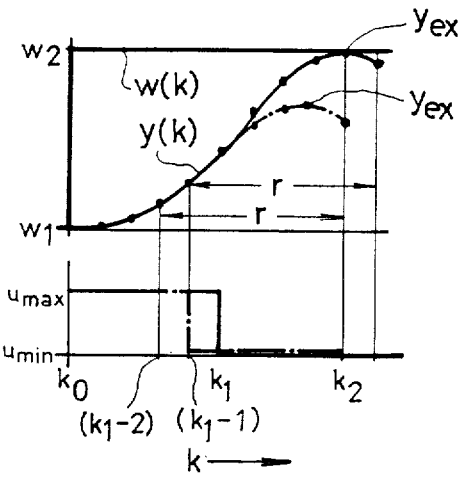
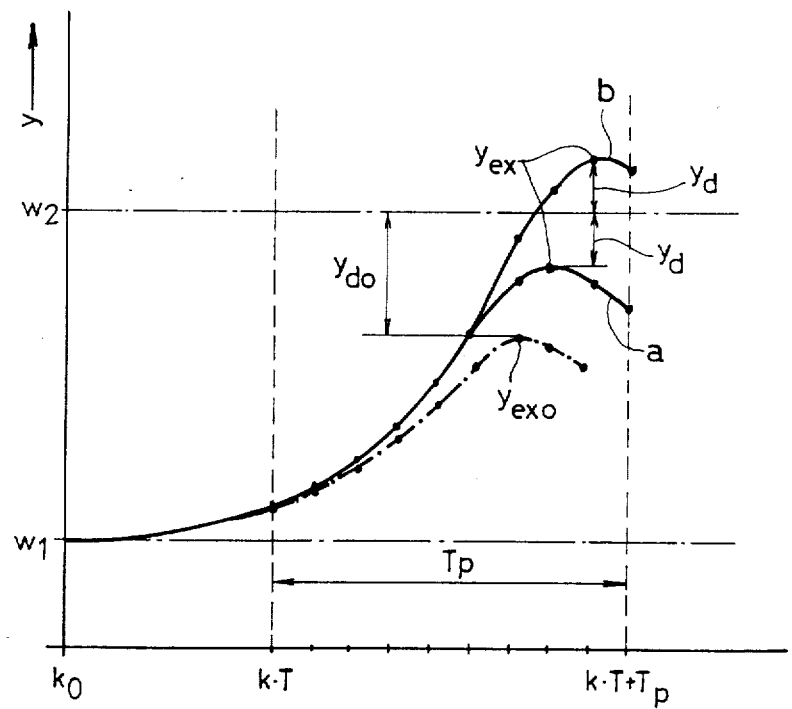

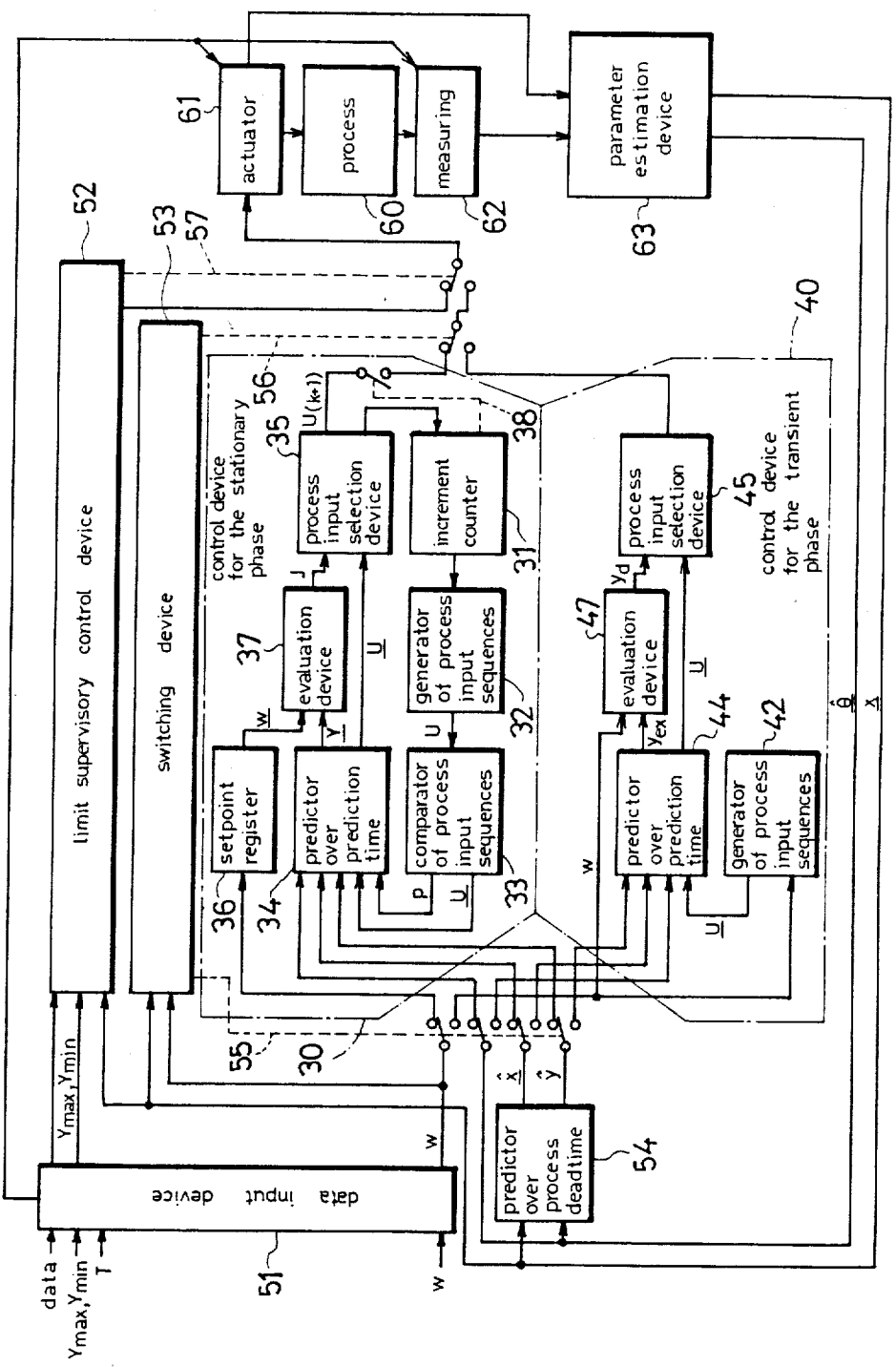

TIME-DISCRETE ADAPTIVE SWITCHING ON-OFF CONTROLLER

BACKGROUND OF THE INVENTION

The present invention relates to an arrangement for the predictive discrete-time adaptive on-off control of continuous-time processes with binary switching actuators.

Controllers with binary switching actuators excel in their reliability and robustness. Parameter adjustment of conventional switching on-off controllers is based on the results of empirical investigations on standardized model processes specified by simple parameters. Due to the non-linearity of the controller an analytical determination of its parameters for an optimal control in the sense of an optimization criterion can be done only with very high effort.

Difficulties in finding suitable controller parameters occur especially in cases where the process to be controlled is not described precisely enough by the parameters of the respective standardized model process or in cases where its dynamics are not sufficiently known or time-variant.

Within the last decades adaptive controllers have been developed which are—contrary to controllers with fixed parameters—able to adapt to the momentary operating conditions of the process to be controlled, thus increasing the quality of control of processes that are insufficiently known or time-variant. By means of known parameter estimation methods a process model is determined and used for finding out and establishing a way of control which is optimal in the sense of a quality criterion.

The adaptive design methods known until recently are based on the assumption that the controller is able to generate any actuating signal level within the actuating range. Therefore they cannot be applied directly for the design of an adjustable control arrangement in on-off controllers, which allow only two possible switching levels. Concepts of such discrete-time adaptive control arrangements as improved so that they can have two switching levels as process input, have been known and realized for several years. For the determination of the on-off actuating signal, here, a prediction of process output sequences over several future sampling intervals as reaction to possible process input sequences is used to estimate the parameters by means of a parameter estimation method and update them in every sampling interval in order to adapt the process model to the process to be controlled, even when the process behaviour changes (Breddermann, R.: Realization and Application of a Selftuning On-Off Controller. Proceedings of the International Symposium on Adaptive Systems, Bochum, FRG, 1980, and Hoffmann, U.; Breddermann, R.: Entwicklung und Erprobung eines Konzepts zur adaptiven Zweipunktregelung, in: Regelungstechnik 29. Jahrgang, 1981, no. 6, pp. 212–213).

Said publications describe a prior art of the invention which up to now has been an imperfect realization of a concept for adaptive switching on-off control which is still to be improved. The realization of the prior art requires a high technical effort. The complex control arrangement has to be operated by highly qualified staff. The control performance documented in the publication mentioned first has a problem of excessive overshooting of the process output in the start-up phase of the process or after setpoint changes which the process is to follow. This problem is normally undesired and even intolerable, in many applications.

SUMMARY OF THE INVENTION

In a discrete-time operating control arrangement for binary switching actuators, the object of the invention is to enable even unskilled personnel to operate it and to avoid overshooting to a great extent in the start-up phase of the process or after setpoint changes without making the additional technical effort which has been required.

In accordance with the present invention this objective is achieved by a combination of an improved parameter estimation means and two alternatively working first and second control means activated by a switching means in dependence of the setpoint and the process output, wherein the process output is measured periodically by a measuring device and the setpoint can be given by means of a device for input and change of data. Synchronously to the measurement of the process output the actuating signal determined by the active control means is given out via an actuator with two switching levels, e.g. a relay for the switching of electrical heaters in thermal processes.

The switching between the said control means is advantageously used to activate the first control means which is especially suited to control disturbances or to follow changes of the process dynamics in the stationary phase of the process or the second control means which is especially suited to approach the desired setpoint without overshooting and simultaneously estimate the process dynamics in the new operating point at the start of the process or after a setpoint change, respectively.

In one way of carrying out the invention the control means for the transient phase, i.e. for the control at the start of the process and after setpoint changes, is activated when the arrangement is turned on to start the process or if a new setpoint is set, and the first control means for the stationary phase is activated when in the transient phase the measured process output reaches a prefixed distance from the setpoint for the first time.

This is advantageous in order to immediately follow the new setpoint and in that a fast and suitable reaction to disturbances is possible, respectively, when there is a transition of the process from the transient to the stationary phase near the setpoint.

In one way of carrying out the invention the parameter estimation means, which works according to the known Least-Squares method with U-D-factorization, yields the current values of the estimated process parameters and the process output values measured currently or at previous instants and the process input values determined currently or at previous instants, which are necessary for the prediction of process output sequences, and sends them as process model to the active control means. The application of the above-mentioned estimation method is useful, as, contrary to the methods applied up to now, it can easily realize fast working numerical stable parameter estimation means. The same process model can be used for the prediction in the same way by both control means, so that a reduction in technical effort is possible.

In one way of carrying out the invention the prediction of the $2^r$ possible process output sequences over r prediction steps within the first control means for the stationary phase can be performed in the following way. The $2^r$ process output sequences are successively predicted, as responces of the process model to the $2^r$ process input sequences being different from each other. During these successive predictions, each of the process input sequences for the current predictions of the process output sequence is such that it has as many as possible switching levels in common with ones of the previously used process input sequence within the nearer future prediction steps and only the switching levels of each of the process input sequences within the farther future prediction steps are changed. And the corresponding values within the process output sequence are predicted only with respect to the switching levels thus changed. This is advantageous in so far as the information gained about possible future process output sequences can be reused during the successive prediction. Thus the technical effort and the necessary time for processing the prediction within the first control means can be reduced.

In one way of carrying out the invention each prediction step of the prediction within the first control means for the stationary phase can be divided into several sampling intervals, with the switching levels in the sampling intervals of each prediction step remaining equal. This is advantageous as with constant prediction time the sampling time and thus the quantization of actuating power can be reduced and thereby the necessary processing time only grows linearly and not any longer exponentially with the ratio, prediction time vs. sampling time.

The determination of the evaluation parameter (cost-function) of each predicted process output sequence is made in the known way directly with the prediction of the corresponding process output sequences. In a further carrying out of the invention the actuating signal to be given out in the next sampling interval is selected in process input selection means by comparison of the evaluation parameter of the just predicted process output sequence with that of the process output sequence predicted before. Thus a searching procedure for the minimal value from the $2^r$ evaluation parameters at the end of each sampling step can be avoided.

At the start of the process and after setpoint changes the number of process input sequences that have to be considered for a prediction of possible future process output sequences is smaller than $2^r$. It is the aim of the control action in the transient phases of the process to bring the process output near to the setpoint as fast as possible in order to approach the setpoint with the process output with the least overshooting by switching the actuating signal to its counteracting level early enough. In a further way of carrying out the invention one can advantageously consider that during the transient phases of the process only the prediction of one single process output sequence is necessary.

In a further way of carrying out the invention the second control means which is active at the start of the process or after setpoint changes is designed in such a way that the extremal point of the future process output sequence is predicted on the basis of one particular process input sequence, which provides only such one single switching of the actuating signal, that is made after the first sampling interval within that process input sequence.

In a further way of carrying out the invention the second control means for the transient phase contains a process input selection means which selects the actuating signal for the first sampling interval, within the above particular process input sequence, if the extremal point of the predicted process output sequence lies below the new setpoint value after positive setpoint changes and above the new setpoint value after negative setpoint changes, so that no overshooting of the process output occurs.

In a further way of carrying out the invention process input selection means applied for the transient phase of the process is designed in such a way that in all other cases, i.e. where an overshooting is predicted when maintaining the last actuating signal, the actuating signal to be given out in the next sampling interval is favourably selected as the one which results from switching such an actuating signal to its counteracting level that is for the first sampling interval of the above particular process input sequence used for the prediction.

In accordance with the invention, the second control means active at the start of the process or after a setpoint change uses a number of predictions of possible future process output sequence that is smaller than that of the ones used by the first control means active for the stationary phase. The thus saved processing time is advantageously used in such a way that predicting means within the second control means is enabled to make a prediction of the mentioned single process output sequence which reaches further into the future.

That way the early recognition of the time for switching the actuating signal to the counteracting level is ensured and a possibly too late switching due to a too small number r of prediction steps can be avoided.

If the parameters of the process model used for the prediction are incorrectly estimated an output of false actuating signal that leads to intolerable operating conditions can occur more often with an arrangement of that kind than with conventional control devices. In a way of carrying out the invention therefore a superior limit supervisory control means is applied in such a way that if the process output exceeds its preset upper or lower limit, respectively, the just active first or the second control means is turned off and the actuating signal of the process is switched Off or On, respectively.

In a further way of carrying out the invention limit supervisory control means, which can be activated manually, is applied for the control of the process. According to the control by limit supervisory control means, by means of the actuator the process is excited in such a way that the process output periodically moves within a range of preset upper and lower limits. This oscillation which in general is comparatively stronger than the limit cycle in the stationary phase can advantageously be used to determine a process model which matches as well as possible with the real process. After the determination of the process model, when the first or second control means is made active, predicting means within the first or second control means can thus rely on a useful process model from the very beginning of the control phase.

In a way of carrying out the invention the actuator for the output of the actuating signal is driven at the same time with the same tact rate as the measuring device for the acquisition of the process output.

BRIEF DESCRIPTION OF THE DRAWINGS

FIG. 2 shows a process input, a process output, a deadtime and a prediction time, wherein (a) represents the process inputs and the process outputs required to describe a process model, and (b) the process input sequences and the process output sequences in predictions of process outputs, respectively.

FIG. 3 shows the relationship among a prediction time, a number of a prediction steps and sampling intervals divided within one prediction step.

FIG. 6 shows how the process output approaches a new setpoint in the transient phase when the process input is once switched, (a) being in the continuous-time case, while (b) in the discrete-time case.

FIGS. 7 and 8 show the predicted process output sequences and their evaluation.

FIG. 10 is a block diagram showing the structure of discrete-time adaptive on-off switching controller.

DETAILED DESCRIPTION OF PREFERRED EMBODIMENTS

The structure of the concept

The discrete-time adaptive on-off switching control consists of the two components, i.e. parameter estimation and predictive switching on-off control. The predictive switching on-off control can be divided into the prediction of process output and the determination of the optimal on-off actuating signal.

Figure 1:
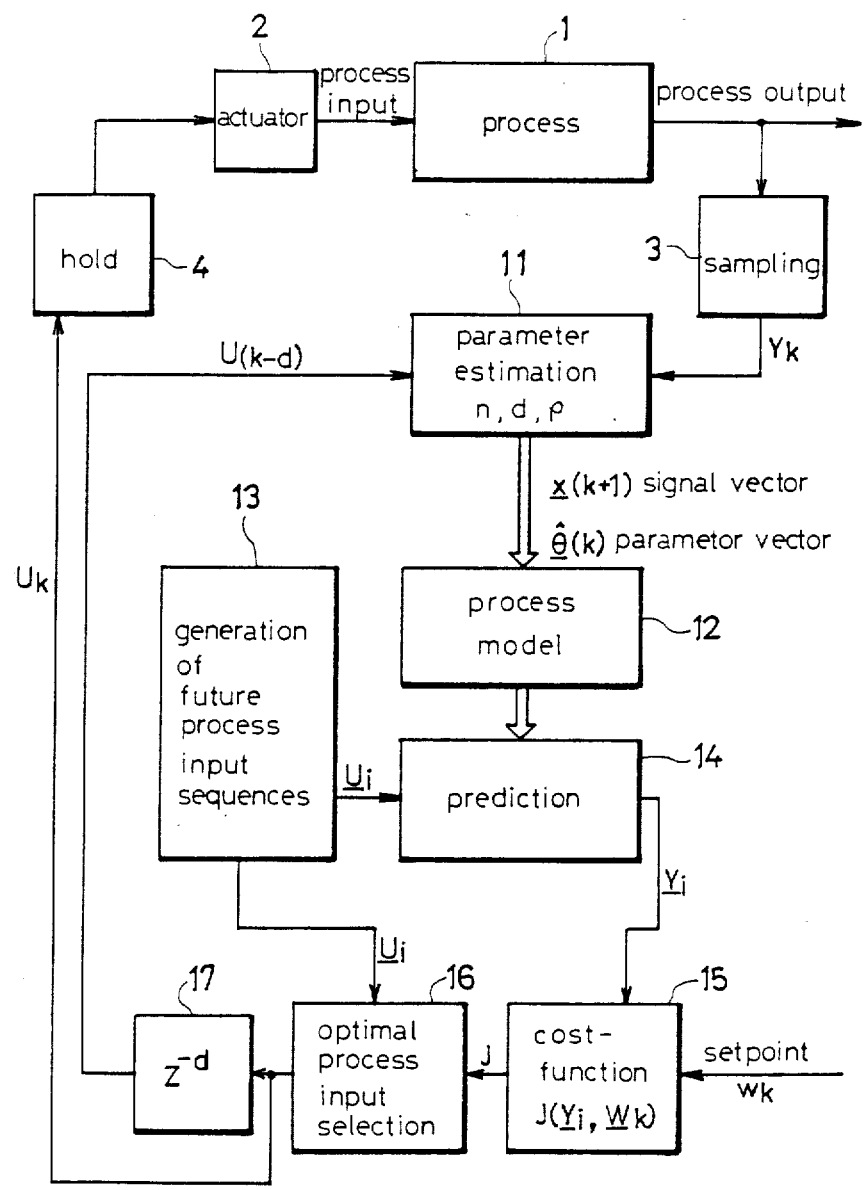
FIG. 1 is a block diagram showing the structure of the concept of the discrete-time adaptive on-off control.

FIG. 1 shows the structure of this concept (especially that of control in stationary phase). The process 1 is, for example, a furnace provided with an electric heater. In this case, heating electric current being fed to the heater, process input is heating electric current. The heating electric current fed to the heater is on-off controlled by means of an actuator 2, for example, a relay. The temperature of the furnace is measured at predetermined sampling intervals T by a sampling device 3. Thus, in this case the process output is temperature.

For the parameter estimation, the process output Y(k) measured at equidistant time instants and the process input U(k) actually applied to the process 1 are used. As shown by Eqn. (1), from these values Y(k) and U(k) the d.c.—values $Y_o$ and $U_o$, respectively, are subtracted, $$y(k) = Y(k) - Y_o$$

$$u(k) = U(k) - U_o \quad (1)$$

wherein k is a parameter for discretely representing time, and time is represented by k·T (k=0, 1, 2 ...) using sampling time intervals T.

$U_o$ and $Y_o$ give the reference values of process input and output in the operating point considered. They can be determined in the standstill phase of the process as $U_o=0$ and $Y_o=Y(0)$, for instance.

These process input and output are used in an estimation algorithm (block 11 for parameter estimation) to determine a discrete-time process model 12. This process model 12 is represented by Eqn. (2).

$$G(z^{-1}) = \frac{\hat{A}(z^{-1})}{\hat{B}(z^{-1})} \cdot z^{-d} \quad (2)$$

wherein $\bar{G}$ means transfer function of the process and $z^{-d}$, deadtime element, $\hat{A}(z^{-1})$ and $\hat{B}(z^{-1})$ being each given by the following Eqns. with the sign " ^ " denoting estimated value, $$\hat{A}(z^{-1}) = 1 + \hat{a}_1 \cdot z^{-1} + \ldots + \hat{a}_n z^{-n}$$

$$\hat{B}(z^{-1}) = \hat{b}_1 \cdot z^{-1-d} + \ldots + \hat{b}_n z^{-n-d} \quad (3)$$

wherein $\hat{a}_1, \ldots, \hat{a}_n$ and $\hat{b}_1, \ldots, \hat{b}_n$ are parameters to be estimated. The model order n as well as the number of deadtime steps d have to be chosen suitably depending on the process to be controlled.

The process model at time k·T is completely described by its parameters $a_i$ and $b_i$, $i=1, \ldots, n$; and the process input $u_i$ ($i=(k-n-d+1), \ldots, (k-d)$) and output $y_i$ ($i=(k-n+1), \ldots, k$). Though the process input $u_i$ is a value estimated and actually given to the process, it is delayed by deadtime steps d by means of a deadtime element 17. The process output $y_i$ is a value taken out by the sampling device 3. In FIG. 2(a) the process input $u_i$ and the process output $y_i$ to describe the model 12 at time k·T are indicated on time axis.

These parameters $a_i$ and $b_i$ as well as the process input $u_i$ and the process output $y_i$ can be written in vector form as follows. The sign " _ " means vector. parameter vector $$\underline{\hat{\theta}}(k) = \begin{pmatrix} \hat{a}_1 \\ \cdot \\ \cdot \\ \cdot \\ \hat{a}_n \\ \hat{b}_1 \\ \cdot \\ \cdot \\ \cdot \\ \hat{b}_n \end{pmatrix} \quad (4)$$

$$= (\hat{a}_1 \ldots \hat{a}_n | \hat{b}_1 \ldots \hat{b}_n)^T$$

and signal vector $$\underline{x}(k+1) = (-y(k) \ldots -y(k-n+1) | u(k-d) \ldots u(k-d-n+1))^T \quad (5)$$

The recursive estimation of the model parameters $\hat{a}_i$ and $\hat{b}_i$ and the updating of the signal vector are given in the section "parameter estimation".

The thus gained process model 12 is used in the predictive on-off switching control to determine the on-off process input to be applied to the process 1 at the next sampling interval from the view-point of a chosen costfunction 15 (in the case of multi-step optimization, namely stationary phase). As will be describe later, based on this actual process model 12 future process output sequence $\underline{Y}_i$ are predicted (block 14). These output sequences $\underline{Y}_i$ are response of the process model 12 to the future process input sequences $\underline{U}_i$ generated in the block 13. Besides, these process output sequences $\underline{Y}_i$ are sequences which would be possible within a prediction time $T_p$ ahead of the deadtime d·T. Afterwards, the predicted process output sequences $\underline{Y}_i$ are evaluated by a costfunction 15. The process input sequence is said to be optimal when the costfunction comes to minimum value owing to the corresponding process output. The first element of the process input sequence thus determined to be optimal (block 16) is used to switch on or off the actuator 2 of the process 1 at the next sampling interval.

As shown in FIG. 3, the prediction over the prediction time $T_p$ is made by dividing this $T_p$ into a certain suitable number of r prediction steps, each prediction step consisting of q sampling intervals, within which the process input u is assumed to have the same constant value. Thus the prediction time $T_p$ is given by the following Eqn:

$$T_p = r \cdot q \cdot T \tag{6}$$

Thus there exist $2^r$ process input sequences within the prediction time $T_p$. With respect to this prediction time $T_p$, one optimal process input sequence is determined.

The possibility of dividing each prediction step into q sampling intervals serves to decouple the choice of the sampling interval T from the selected prediction time $T_p$ and the number of prediction steps r. More specifically, the sampling interval T can be optionally fixed irrespective of the prediction time $T_p$ or the number of prediction steps r.

The multi-step-optimization over r>1 prediction steps is a more suitable optimization method than the one-step-optimization (r=1), as is described in the section "predictive on-off switching control".

The answer to the question as to which of the $2^r$ process input sequences are considered for prediction and evaluation, depends on the control task. There are following two cases of control task:

(1) control of the process in the stationary (steady state) phase (2) control of the process in the transient phase.

In the first case the "stationary phase control" is made, where all $2^r$ process input sequences are evaluated. In the second case, e.g. after setpoint changes or in the start-up or shut down phase of the process, the control is made via the "transient phase control". Only one process input sequence is used for prediction here. In either case, according to the process output sequence predicted it is decided whether the actual value of the process input to be applied to the process 1 is kept constant at the next sampling instant or has to be switched to its counteracting level.

The decision as to which of the two switching controls is to be applied at the moment depends on the set-point- and the process output sequence. The change-over from the stationary phase control to the transient phase control is made, e.g., after a setpoint change has occurred. The change-over from the transient phase control to the stationary phase control happens, e.g., when the absolute value of the deviation (difference between setpoint w and the measured process output y) $|y_d| = |y-w|$ is smaller than 0.5% $Y_h$ ($Y_h$ is the possible full control range) for the first time after the setpoint has changed. Thus the stationary phase control is not used until the transient phase is settled to a full extent.

Parameter estimation

The Recursive Least Squares estimation (RLS-estimation) is a suitable parameter estimation method within the adaptive on-off switching controller. This method is applicable to any processes, and further according to this method computer load can be reduced. The aim of the parameter estimation is to determine the parameters $\hat{a}_i$ and $\hat{b}_i$ of the process model (see Eqn. (2) and (3)) at any sampling instant $k \cdot T$ from the acquired values y(k) and u(k). This aim is realized by minimizing the so-called equation error (Eqn. (7)) of the loss function (Eqn. (8)).

$$V_{RLS} = \sum_{i=0}^{k} e^2(i) \tag{7}$$

$$e(k) = y(k) - \underline{x}^T(k) \cdot \underline{\hat{\theta}}(k-1) \tag{8}$$

The recursive estimation of the parameter vector $\underline{\hat{\theta}}$ is performed by adding a correction term, the product of the equation error e(k) and a correction vector g(k) (Eqn. (10)), to the latest actual parameter vector $\underline{\hat{\theta}}(k-1)$. In other words, the recursive estimation equation is given as $$\underline{\hat{\theta}}(k) = \underline{\hat{\theta}}(k-1) + \underline{g}(k) \cdot e(k). \tag{9}$$

The correction vector g(k) (Eqn. (10)) includes the scalar (Eqn. (11)) and the normalized covariance matrix of the parameter error (Eqn. (12)).

$$\underline{g}(k) = \frac{1}{\alpha^2(k)} \underline{P}(k-1) \cdot \underline{x}(k) \tag{10}$$

$$\alpha^2(k) = \underline{x}^T(k) \cdot \underline{P}(k-1) \cdot \underline{x}(k) + \rho; \ 0 < \rho \leq 1 \tag{11}$$

$$\underline{P}(k) = (\underline{I} - \underline{g}(k) \cdot \underline{x}^T(k)) \cdot \underline{P}(k-1)/\rho \tag{12}$$

($\underline{I}$ = identity matrix)

The adaption factor $\rho$ in Eqns. (11) and (12) means the weight of data. Owing to this $\rho$ a higher evaluation is given to the present data than to the past data. The choice of $\rho < 1$ causes a greater change of parameters, which results in giving a greater margin for parameter changes and allowing an easier tracking of time-variant processes.

The above-mentioned method for determining model parameters is well known in control engineering. A more general description of this estimation method can be found among other in: Aström/Eykhoff: System Identification—A Survey. Automatica, Vol. 7, pp. 123-162, Pergamon Press, 1971 and V. Strejc: Least Squares Parameter Estimation. Automatica, Vol. 16, pp. 535-550, Pergamon Press, 1980.

The possibility to estimate the process parameters with a sufficient exactness depends, among other things, on the numerical data processing on a digital computer. The word length L (in Bit) of the internal arithmetical data representation has an influence on the parameter accuracy. Especially when using micro computers with L=32 Bit word length for the representation of sign, mantissa and exponent rounding errors can occur that lead to numerical instabilities of the recursive estimation. Possibilities to avoid these problems are given by the U-D-Factorization. This method was proposed by Bierman: Measurement Updating using the U-D-Factorization. Automatica, Vol. 12, pp. 375-382, Pergamon Press, 1976.

This method is based on the calculation of the covariance matrix as matrix product $$\underline{P}(k) = \underline{U}(k) \cdot \underline{D}(k) \cdot \underline{U}(k)^T. \tag{13}$$

$\underline{U}(k)$ is an upper triangular matrix, while $\underline{D}(k)$ is a diagonal matrix and can be stored in vector form. This modification of the above-mentioned Least Squares parameter estimation method is favourably used with the discrete-time adaptive on-off switching controller in order to ensure proper estimates when using a micro computer.

The predictive on-off switching control (1) The stationary phase control

In the stationary phase control all $2^r$ possible process input sequences are evaluated over the given r prediction steps. The evaluation of all possible process input sequences ensures that an optimal and not a suboptimal switching behavior is determined for the next r prediction steps.

The prediction and its evaluation in order to determine the optimal switching behaviour are described below. For an easier understanding and without loss of generality one prediction step is chosen as one sampling interval, i.e. $q=1$. The process input can assume only two actuating levels $u_{max}$ and $u_{min}$ so that all $2^r$ process input sequences resulting from block 13 (FIG. 1) are known beforehand. $2^r$ process input sequences over the future prediction steps are given by the following equation.

$$\underline{U}_i(k+1) = (u(k+1) \ldots u(j) \ldots u(k+r))^T; 1 \leq i \leq 2^r \quad (14)$$

with $$u(j) \in \{u_{max}, u_{min}\}$$

The two process inputs $u_{max}$ and $u_{min}$ correspond to 1 (H level) and 0 (L level), respectively when represented in terms of the switching levels of the actuator 2. More specifically, when the actuator 2 is on, the process input $u_{max}$ is given to the process 1 and when it is off, $u_{min}$ is applied thereto. For a better understanding, all the process input sequences are represented in terms of the switching levels of the actuator 2 as follows:

$$\begin{array}{l} \overbrace{\underline{U}_1 = (1 \ 1 \ 1 \ldots 1 \ 1)^T}^{r} \\ \underline{U}_2 = (1 \ 1 \ 1 \ldots 1 \ 0)^T \\ \underline{U}_3 = (1 \ 1 \ 1 \ldots 0 \ 1)^T \\ \vdots \\ \underline{U}_{(2^r-1)} = (0 \ 0 \ 0 \ldots 0 \ 0)^T \end{array} \quad (15)$$

The process input sequences with $r=3$ are shown by means of a tree structure at (a) in FIG. 4.

The future process output sequences $\underline{Y}_i$ predicted (FIG. 1, block 14) as response of the above-mentioned process model 12 to those process input sequences $\underline{U}_i$ are given by the following equation $$\underline{Y}_i(k+1) = (\hat{y}(k+d+2) \ldots \hat{y}(j) \ldots \hat{y}(k+d+r+1))^T | \underline{U}_i \quad (16)$$

wherein the sign " ^ " means a predicted value.

Figure 4A:
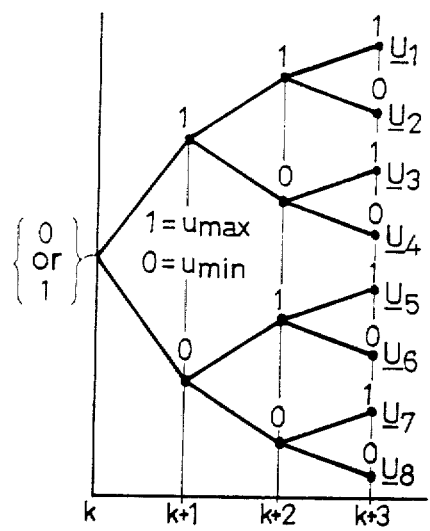
FIG. 4 shows a prediction of the process output over three prediction steps, where (a) depicts a tree structure with possible input sequences and (b), resulting process output sequences, respectively.
Figure 4B:
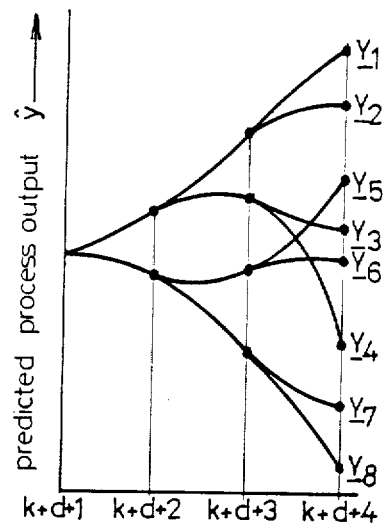

FIG. 4(b) indicates the predicted process output sequences $\underline{Y}_i$ in the case of $r=3$. Because of the deadtime element, the process output sequences are delayed by $(d+1)$ steps.

As seen from FIG. 4(a), the process input sequences $\underline{U}_1 \ldots, \underline{U}_4$ each have a common value 1 ($u_{max}$) at $(k+1)$ and different values at $(k+2)$ and $(k+3)$. As to the process input sequences $\underline{U}_1$ and $\underline{U}_2$, it will be noticed that each of these sequences has a common value 1 at $(k+1)$ and $(k+2)$ and different values merely at $(k+3)$.

Generally speaking, there exist $2^p$ of the $2^r$ process input sequences which differ from each other only within the last p prediction steps. All the process output sequences are predicted by making use of such fact. Thus the information about the future process output gained within the first $(r-p)$ prediction steps can be used for further predictions of $(2^p-1)$ process output sequences once it has been calculated. It is sufficient to predict the $(2^{r+1}-2)$ possible values of the process output at equidistant time instants in order to determine all $2^r$ process output sequences within the prediction time. With $r=3$, $(2^{r+1}-2)=14$. In FIG. 4(b) the number of black dots ● is 14. Originally, $(2^r \times r)$ process outputs, for example in the case of $r=3$, 24 process outputs have to be predicted, but according to this way of avoiding the duplication of the calculation for prediction, far less predictions are sufficient.

The prediction of the process output is performed by calculating with use of the estimated values, as shown by the following equations, $$\hat{y}(k+1) = \underline{x}^T(k+1) \cdot \hat{\underline{\theta}}(k) \quad (17)$$

$$\hat{y}(k+1+j) = \hat{\underline{x}}^T(k+1+j) \cdot \hat{\underline{\theta}}(k) \quad (18)$$

with $$1 \leq j \leq d+r.$$

The parameter vector $\hat{\underline{\theta}}(k)$ in Eqns. (17) and (18) is given by Eqn. (4) and the signal vector $\underline{x}^T(k+1)$ in Eqn. (17), by Eqn. (5). Consequently, the process output $\hat{y}(k+1)$ of Eqn. (17) is predicted from the process model at time $k \cdot T$.

In Eqn. (18), the signal vector $\underline{x}^T(k+2)$ has to be gained so as to predict the process output $\hat{y}(k+2)$ in the case of $j=1$. The signal vector $\underline{x}^T(k+2)$ is acquired by subsubstituting k with $(k+1)$ in Eqn. (5). This substitution is equivalent to newly introducing $\hat{y}(k+1)$ and $u(k-d+1)$ as the values in the first and the $(n+1)$th rows respectively, shifting the values in other rows to the following rows sucessively and further removing the values in the nth and th 2nth rows, in the signal vector $\underline{x}^T(k+1)$ of Eqn. (5). In Eqn. (5) with the substitution of $k \rightarrow k+1$, $\hat{y}(k+1)$ is the predicted value derived from Eqn. 17. The other values $y(k), \ldots, y(k-n+2)$ and $u(k-d+1), \ldots, u(k-d-n+2)$ are known ones.

Similarly, the signal vector $\hat{\underline{x}}^T(k+1+j)(j>1)$ is succesively derived from the signal vector $\hat{\underline{x}}^T(k+j)$, by updating the first and the $(n+1)$th elements with $\hat{y}(k+j)$ and $u(K-d+j)$, respectively. With $(k-d+j)<(k+1)$, $u(k-d+j)$ are known values and with $(k-d+j) \geq (k+1)$, possible values are adopted as $u(k-d+j)$.

Thus derived $\hat{y}(k+1), \ldots, \hat{y}(k+d+1)$ of the predicted process outputs are predicted values based on the already determined values. This is the prediction over process deadtime (FIG. 10 block 54). See FIG. 2(b) as well.

Within the following r prediction steps all process output sequences $\underline{Y}_i$ which are caused by the possible process input sequences $\underline{U}_i$ are derived by calculating Eqn. (18). This is the prediction over prediction time (FIG. 10 block 34). See FIG. 2(b) as well.

The division of each prediction step into sampling intervals of constant actuating level means the number of recursive solutions of Eqn. (18) which is q-times larger than the above-mentioned case with q=1 appears. Accordingly the vector $\underline{Y}_i$ becomes q-times longer.

With the calculation of the predicted process output $\hat{y}$ goes the evaluation by means of the costfunction. Although the predictive on-off switching control is separated into prediction and determination of the optimal on-off actuating level, it is sensible to combine prediction with costfunction evaluation for enhancing the computational efficiency.

For the evaluation the predicted process output sequences $\underline{Y}_i$ are compared with the setpoint. In the stationary phase the setpoint is assumed to be constant, so that future setpoint values are given by $$w(k)=w(k+1)=\ldots=w(k+d+r+1). \quad (19)$$

The necessary setpoints are incorporated in the setpoint vector for the comparison with the process output sequence vector $\underline{Y}_i$. The setpoint vector is represented by $$\underline{W}(k+1)=(w(k+d+2)\ldots w(k+d+r+1))^T. \quad (20)$$

The multi-step-costfunction thus reads:

$$J(k+1)=J(\underline{Y}_i(k+1)-\underline{W}(k+1)). \quad (21)$$

In practice, integral criteria are often used as costfunctions, wherein the difference between the process output and the setpoint is suitably weighted and when its value has become minimum, the process output is evaluated to the optimal. Accordingly the predictions in the adaptive on-off switching controller are evaluated by discrete-time approximations of the following integral criteria $$J(k+1) = \sum_{j=1}^{r} I(k+j)$$

with $$I_{ITAE}(k+j)=j|\hat{y}(k+d+1+j)-w(k+d+1+j)|, \quad (22)$$

$$I_{IAE}(k+j)=|\hat{y}(k+d+1+j)-w(k+d+1+j)| \quad (23)$$

$$I_{ISE}(k+j)=(\hat{y}(k+d+1+j)-w(k+d+1+j))^2 \quad (24)$$

$$I_{ITSE}(k+j)=j(\hat{y}(k+d+1+j)-w(k+d+1j))^2. \quad (25)$$

In Eqns. (22) and (25) weight j is added.

In the preferred embodiment of the stationary phase control, Eqn. (22) is used.

Multi-step-optimization (r>1) leads to a better control performance than a one-step-optimization (r=1). The evaluation of the preditions over r prediction steps by a multi-step-costfunction J is equal to the sum of the one-step-costfunction I:

$$J(k+1) = \sum_{j=1}^{r} I(k+j).$$

Figure 5:
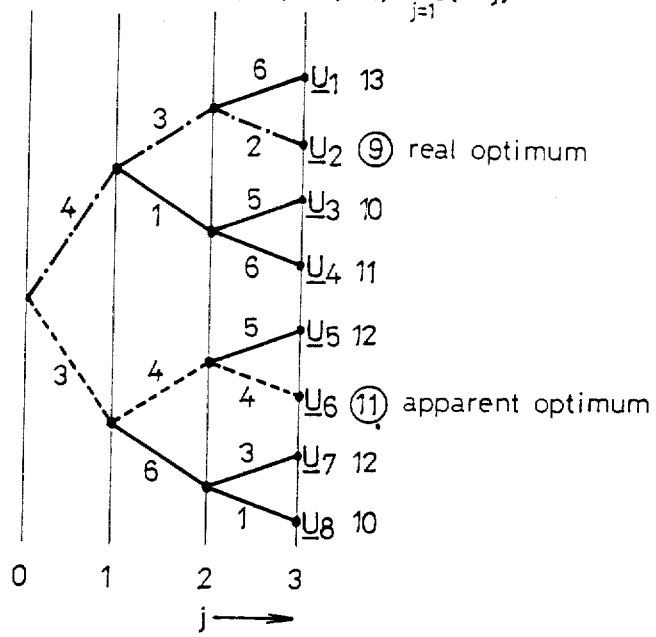
FIG. 5 shows a tree structure denoting all $2^r$ process input and output sequences (r=3) and corresponding costfunctions.

FIG. 5 depicts the results of the optimization procedure. The $2^r$ (r=3) process input sequences $\underline{U}_i$ (see FIG. 4) and output sequences, respectively, correspond to the $2^r$ branches of the tree. The values indicated at the branches, such as 3, 4, . . . , denote the values of the one-step-costfunction I(k+j) or those of the multi-step-costfunction J for r=1. In the one-step-prediction (shown by broken lines), at the first step of the prediction, 4 and 3 were gained as the values of I(k+1), so that the smaller value 3 of these ones is considered to be optimal. At the second step, 4 and 6 were gained as the values of I(k+2) and 4 of these values is chosen. At the third step, 4 of the values 5 and 4 of I(k+3), is selected. Accordingly, over the three steps depicted the one-step-optimization leads to an apparent optimum with J=11. On the contrary, in the three-step-optimizaton (indicated by a dot-and-dash line), since the smallest one among J=13, 9, . . . ,12,10 is 9, the process input sequence $\underline{U}_2$ producing 9 is considered to be the real optimum. In this way, the one-step-optimization leads a slightly inferior control when compared with the multi-step-optimization.

(2) The transient phase control

For the prediction and evaluation of process output sequences in the transient phase, the number of the process input sequences to be investigated can be reduced. How the transient phase control is performed is shown by FIG. 6, in which (a) is the continuous-time case and (b), the discrete-time case. In the continuous-time case (FIG. 6(a)), it is assumed that at a time $t_o$ the setpoint has been changed from $w_1$ to $w_2$. The process output y(t) is approaching this new stepoint $w_2$ as time goes by. There exists a time $t_1$ at which the process input u(t) should be switched once to the counteracting level (for example, from $u_{max}$ (1) to $u_{min}$ (0)) so that at a time $t_2$ later than the time $t_o$ the process output $y(t_2)$ satisfies the following equations:

setpoint deviation $$w_2-y(t_2)=0 \quad (26)$$

and its derivative $$\dot{y}(t_2)=0 \quad (27)$$

By such switching of the process input, the process approaches the new setpoint quickly and without overshooting. For processes of 1. order or those of higher order, the higher derivatives of which in their differential equation have no significant influence on the process behaviour, there is an immediate transition to the stationary phase at the time $t_2$, so that no further setpoint deviations occur.

In a discrete-time control, the time interval $(t_1-t_o)$ can be approximated with a sufficient accuracy by an interval $(k_1-k_o)\cdot T$, when T is sufficiently small. So the above-mentioned response of the process output (see Eqns. (26) and (27)) can be realized in such an exact way also in the discrete-time control. In FIG. 6(b), the dot-and-dash line shows the process output y(k) predicted within the prediction time starting from a time $(k_1-b)$. This process output y(k) is that which is predicted based on such a process input (indicated by the dot-and-dash line) as will be switched once to its counteracting level after the next sampling interval. The process output and the process input shown by the solid lines in FIG. 6(b) indicates the values predicted within the prediction time starting from a time $(k_1-1)$. Since the transient phase control is a control performed within a period until the predicted future process output y(k) reaches a new setpoint $w_2$, for the prediction it is sufficient to determine only the position of the extremal point $y_{ex}$ (max. value or min. value) of the process output.

Accordingly it suffices to predict merely one process output sequence caused by the process input sequences $U(k+1)$ given by the following equations, respectively:
In the case where setpoint change $(w_2-w_1)$ is positive $$U(k+1)=(u_{max}, u_{min}, \ldots, u_{min})^T \qquad (28)$$

In the case where setpoint change $(w_2-w_1)$ is negative $$\underline{U}(k+1)=(u_{min}, u_{max}, \ldots, u_{max})^T \qquad (29)$$

The evaluation of the process output sequence and its position of the extremal point lead to a decision, whether the process input $u(k+1)$ in the next sampling interval has to be switched or not.

Figure 8:
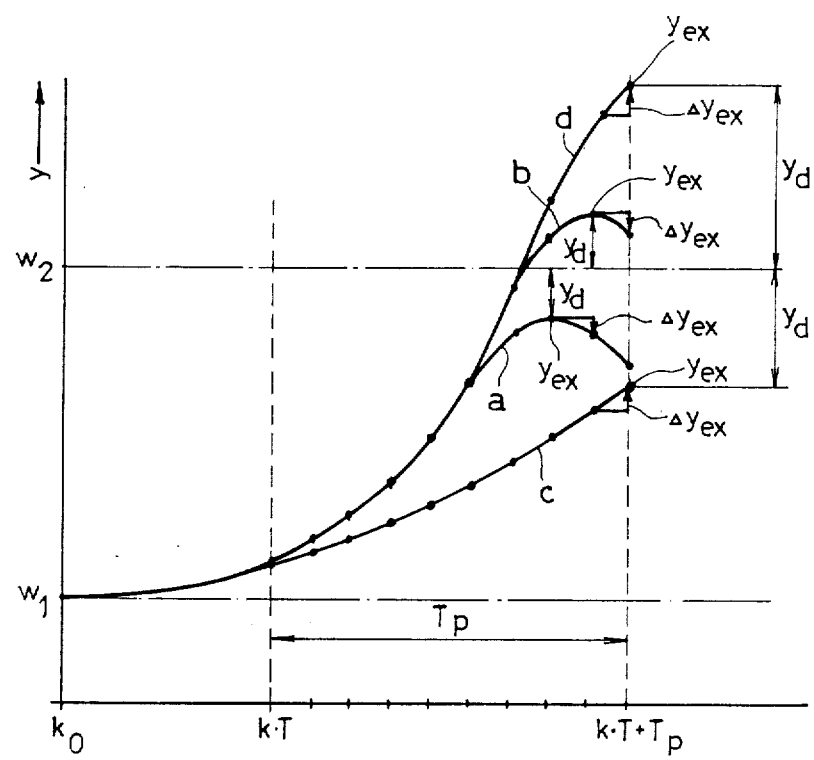

The prediction based on Eqn. (28), i.e. the case of $w_2 > w_1$ is explained with reference to FIG. 7. In FIG. 7 the dot-and-dash line indicates the process output sequence predicted at the latest sampling interval, while the solid lines respectively show two kinds of examples (a) and (b) of the process output sequence predicted on the base of the process input of Eqn. (28) at the current time. As in the case of the predicted output sequence (a), when the setpoint deviation $y_d = w_2 - y_{ex}$ in the extremal point $y_{ex}$ is positive and is a value smaller than that which was predicted in the latest sampling interval $(y_d < y_{do}, y_d > 0)$, the process input sequence of Eqn. (28) is considered to be optimal. In other words, $u(k+1) = u_{max}$ holds. As in the case of the predicted process output sequence (b), if the setpoint deviation $y_d$ in the extremal point is not zero and chages its sign $(y_d = w_2 - y_{ex} < 0)$, the process input for the next sampling interval is switched. In short, it is switched to $u(k+1) = u_{min}$. As denoted by (c) and (d) in FIG. 8, a determination of $u(k+1)$ is allowed even in the case where no real extremal point but only a local extremal point at the end of the prediction time could be predicted. More specifically, in the case of (c), $u(k+1) = u_{max}$ holds because the local extremal point does not reach the setpoint $w_2$, while in the case of (d) the process input is switched to $u(k+1) = u_{min}$ because the local extremal point exceeds the setpoint $w_2$.

The above is summarized with respect to the process output sequence predicted at the current time as follows:

$$y_d = w - y_{ex}; \Delta y_d = \Delta y_{ex} \qquad (30)$$

(a) $y_d \geq 0; \Delta y_d \leq 0 \rightarrow u(k+1) = u_{max}$ (b) $y_d < 0; \Delta y_d \leq 0 \rightarrow u(k+1) = u_{min}$ (c) $y_d > 0; \Delta y_d > 0 \rightarrow u(k+1) = u_{max}$ (d) $y_d \leq 0; \Delta y_d > 0 \rightarrow u(k+1) = u_{min}$ The optimization in the case of negative setpont changes on the basis of Eqn. (29) goes similarly. Here only the sign of the setpoint deviation $(w_2 - y_{ex})$ in the extremal point and its forward difference $(\Delta y_{ex})$ are inverted, so that the newly defined setpoint deviation can be used in the same prediction- and optimization-procedure as for positive setpoint changes.

The prediction of the process output sequence as response of the process model to the process input sequence given in Eqns. (28) and (29) is performed in the same way as with the stationary phase control. As it suffices only one process input sequence is evaluated, the required computing time is far shorter than that for the stationary phase control under the assumption of equal prediction time $T_p$. The thus obtainable computing time between the sampling instants can be favourably used to enlarge the number of prediction steps to $r_{tr} = (2^{r+1} - 2)$, thereby increasing the prediction time $T_p$ for the transient phase. For example, when the number r of the prediction steps in the stationary phase control is 3, with the same computing time, the number $r_{tr}$ of the prediction steps in the transient phase really comes to 14. In this way, during the transient phase the prediction time $T_p$ can be lengthened enough to find the optimal sampling interval for switching sufficiently early.

In short, the larger the number r of the prediction steps, the more sufficiently the optimal process output can be predicted. However, in the event that the calculation for the prediction is carried out by means of a micro computer, it takes quite a long time, so that the number r of the prediction steps cannot be enlarged too much. The above-mentioned transient phase control allows to make this number r of the prediction steps sufficiently large, so that it is possible to avoid the overshooting of the process output even if the process responds quickly.

Further, there being no basic data for the parameter estimation at the start-up time of the process, the adaptive on-off switch controller is arrnaged to be supplied with initial values of the parameters from the outside.
Supervisory control and application of a binary test signal The adaptive on-off switching controller is provided with a limit supervisory control, which permits switching the process input off or on in the next sampling interval when the process output exceeds the upper limit $Y_{max}$ or drops below the lower limit $Y_{min}$. The exceeding of the limits is indicated via an alarm line. The adaptive on-off switching controller is disconnected until it is set in operation again.

Figure 9:
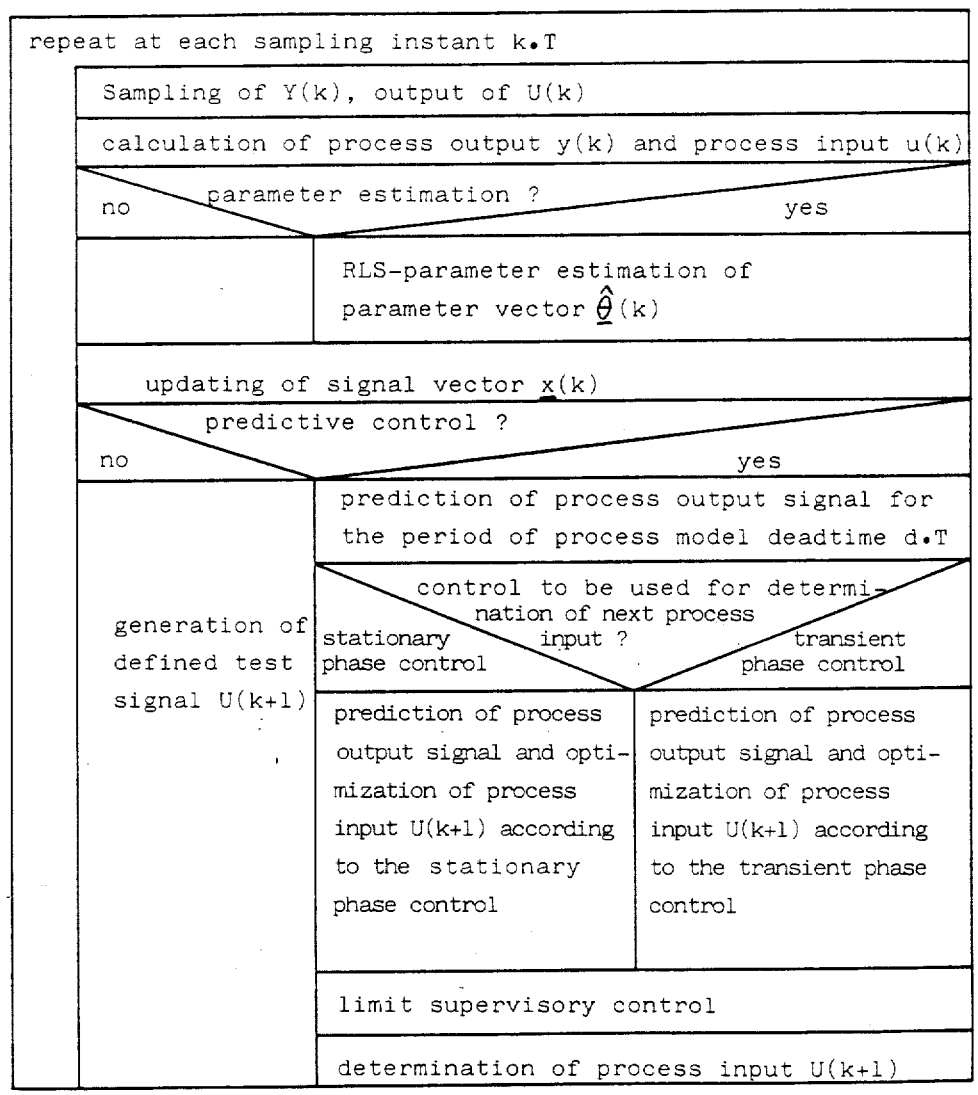
FIG. 9 is an NS chart showing the operation flow of the discrete-time adaptive on-off switching controller.

In the preferred embodiment it is possible to disconnect the predictive on-off switching control in order to excite the process by a defined binary test signal. This may be useful for parameter estimation without closed loop adaptive on-off switching control. At first the actuating signal is switched on by the test signal until the process output exceeds the upper limit $Y_{max}$. It is then switched off by the test signal until the process output drops below the lower limit $Y_{min}$. Then the process input is switched on again and the described procedure is repeated. By an appropriate choice of $Y_{max}$ and $Y_{min}$ a process model can be estimated which is valid for a certain vicinity of the desired operating point. When the estimated process model is considered to be sufficiently exact, the predictive on-off switching control can be set in operation again by using the estimated process model as initial data.
Operation flow of the discrete-time adaptive on-off switching controller The operations data acquisition of process output, parameter estimation, determination of the optimal process input for the next sampling instant, output of the determined process input, limit supervisory control and the sequence of their processing are depicted in FIG. 9. The decisions to apply the parameter estimation or not and to apply the generation of the binary test signal or the predictive on-off switching control are made by the operator of the controller. In this way it is possible to choose the desired operation mode.

The data acquisition of the process output is carried out via a device, by which analogue continuous-time process output signals Y(t) can be measured at equidistant time intervals T as discrete-time values Y (k) and are converted to a digital number representation. This representation is then transferred to the micro computer system in order to estimate the actual process model and to determine the optimal process input by use of the predictive on-off switching control for the next sampling instant. Afterwards, the actual process output Y(k) is compared with the control limits $Y_{max}$ and $Y_{min}$. If Y(k) lies within the above-mentioned limits, the determined optimal process input U(k+1) is stored. If Y(k) exceeds the limits, the process input is determined to be on or off and stored by the limit supervisory control as described above. The stored process input is sent to the actuator (e.g. a relay) via a hold element (FIG. 1, block 4) at the next sampling instant. The computer-internal representation of this process input U(k+1) is thus converted to a physical signal (e.g. a TTL-voltage) to drive the actuator of the process.

In FIG. 9, for the reasons of clarity, further error detection operations (e.g. prediction without having an estimated process model) have been omitted here. Furthermore the introduction of new on-line settings of controller parameters (e.g. on-line changes of sampling time etc.) are not depicted here.

The discrete-time adaptive predictive on-off switching controller is realized by a programmed computer or hardware circuits.

The structure of the discrete-time adaptive on-off switching controller

In FIG. 10, via a data input device 51 the values of the physical parameters, i.e. setpoint w, limits of the process output $Y_{max}$ and $Y_{min}$ and sampling time T can be given in, and a limit supervisory control device 52 for the control of the process can be activated and the parameter estimation can be made by the control device 52, if it is provided with no adaptive control device data input, e.g., initial values of estimation parameters of the process model or a signal for manually operating the control device 52. The setpoint is transmitted as discrete-time value w to a switching device 53 and to a stationary phase control device 30 and a transient phase control device 40, these control devices 30 and 40 being activated via a switch 55. The two limits of the process output are transmitted to the limit supervisory control device 52 as signals $Y_{max}$ and $Y_{min}$. This device 52 is activated based on the adaptive control device data input or when the process output exceeds the limits. The parameters of a discrete-time linear model estimated by a parameter estimation device 63 are sent as a parameter sequence θ to a predictor over the process deatime 54 and to the predictors over the prediction time 34 and 44, respectively, of the momentarily active control device 30 or 40. In the same way the values of the process output and input which are necessary for the prediction are transmitted as signal sequence x to the predictor over the process deadtime 54, the limit supervisory control device 52 and the switching device 53. The two latter mentioned devices 52 and 53 use only the actual value of the process output y out of the sequence x.

On the basis of $\underline{x}$ and $\hat{\theta}$ a prediction of future values of the process output over the process deadtime is carried out with the predictor over the process deadtime 54, the process deadtime being realized by d sampling steps as multiples of the sampling time T. Together with the values of the process input known up to now, the first d predicted values $\hat{x}(k+2), \ldots, \hat{x}(k+d+1)$ are transmitted as signal sequence $\hat{\underline{e}}$ and the last predicted value $\hat{y}(k+d+1)$ of the process output $\hat{y}$ is transmitted respectively from the predictor 54. See Eqns. (17) and (18).

In the presentation of FIG. 10, the stationary phase control device 30 is activated in the depicted position of the switches 55 and 56. In this control device 30 an impulse is sent from an increment counter 31 to a generator of the process input sequences 32, which generates one of the $2^R$ process input sequences $\underline{U}$ from the previously used one and sends it as signal sequence to a comparator of the process input sequences 33. The comparator 33 finds out how many of the switching levels of the generated process input sequence $\underline{U}$ are not equal to the corresponding ones of the previously generated sequence and sends this number p and the process input sequence $\underline{U}$ to the predictor over the prediction time 34. For these p prediction steps, the future values of the process output are predicted on the basis of the estimated parameters $\hat{\theta}$, the signal sequence $\hat{\underline{X}}$ and the process output value $\hat{y}$ which are transmitted from the parameter estimation device 63 and the predictor 54 to the predictor 34 and, together with the (r-p) already determined values of the process output, are transmitted as process output sequence $\underline{Y}$ to an evaluation device 37. Together with the setpoint sequence $\underline{W}$, which is generated in a setpoint register 36 in vector form by updating with the setpoint w input and which is transmitted to the evaluation device 37, $\underline{Y}$ is evaluated in the evaluation device 37. Together with the process input sequence $\underline{U}$ sent from the predictor 34, the evaluation parameter (cost-function) J calculated in the device 37 is sent to a process input selection device 35, in which the value J is compared with the last value of J. In this way, the minimum value of J is determined. If the current value J is smaller than the last stored one, the switching level for the next sampling interval, which corresponds to u(k+1), is taken from the corresponding process input sequence $\underline{U}$ stored in the device 35 is output from the device 35, otherwise the switching level which has at last been output is maintained. An impulse is then sent to the increment counter 31, the index is incremented, and sent to the generator 32 is an impulse which repeats the run of operation described above. This procedure is repeated until the increment counter 31 has incremented $2^r$-times. After the $2^r$th increment the increment counter 31 is reset and the switch 38 is closed, so that the switching level output from the device 35 is sent to and available at an actuator 61 where it can be taken over as actuating signal at the next sampling interval.

When the switches 55 and 56 are changed over by the switching device 53 the transient phase control device 40 is activated. Life with the control device 30, the signal sequence $\hat{\underline{x}}$, the value of the process output $\hat{y}$ and the parameter sequence $\hat{\theta}$ are sent to the predictor over the prediction time 44. The setpoint w is sent to a generator of the process input sequence 42. Depending on whether the setpoint change is positive or negative this generator 42 generates a process input sequence $\underline{U}$ which contains in its first sampling interval the switching level On and in other sampling intervals the switching level Off or is established from the corresponding inverse switching levels, respectively. This process input sequence $\underline{U}$ is transmitted to the predictor 44, where the process output sequence as reaction to this process input sequence $\underline{U}$ is predicted over the whole prefixed prediction time. With this predictor 44 the extremal point of the process output $y_{ex}$ is determined simultaneously, which extremal point is sent to an evaluation device 47, together with the setpoint w. The evaluation device 47 determines now the system (setpoint) deviation $y_d$ in the extremal point of the process output $y_{ex}$ and sends it to a process input selection device 45. From the process input sequence $\underline{U}$ transmitted to the device 45 the switching level of its first sampling interval is taken and given out if no overshooting is expected according to the system deviation $y_d$, otherwise such switching level is given out that results from changing of the above switching level to its counteracting level. No repetition of this procedure is necessary here, contrary to the operation of the stationary phase control device 30. The switching level given out from the device 45 is then available at the actuator 61 for the next sampling interval.

The switching device 53 activates the control device 40 by means of the switches 55 and 56, if the setpoint w input is changed. It activates the control device 30 by means of the switches 55 and 56, when the distance between setpoint w and measured value y in the signal sequence $\underline{x}$ is smaller or equal to a prefixed distance during the transient phase control of the process by means of the control device 40.

The limit supervisory control device 52 turns off the active control device 30 or 40 by means of a switch 57 by interrupting the connection between the control device 30 or 40 and the actuator 61 and itself gives the switching level for the next sampling interval, if the process output from the signal sequence $\underline{x}$ exceeds the limit $Y_{max}$ or $Y_{min}$ or if it is activated by an impulse due to a manual operation.

From the data input device 51a signal which corresponds to the sampling time T is sent to the actuator 61 and a measuring device 62 respectively, which use this signal for a synchronous, discrete-time output of the binary actuating signal On or Off to the process 60 and the acquisition of the measurable process output.

The actuating signal and the process output available at the sampling instants at the actuator 61 and the measuring device 62, respectively, are transmitted as discrete-time values to the parameter estimation device 63, where the signal sequence $\underline{x}$ and the parameter sequence $\underline{\theta}$ are determined on the basis of the above mentioned estimation method for the following processing by the control device 30 or 40.

As described above, this discrete-time adaptive on-off switching controller can be carried out by programed computer, especially micro computer.

What is claimed is:

1. An apparatus for a discrete-time adaptive on-off switching control of a continuous-time process by means of a binary switching actuator producing two levels of actuating switching signals to on-off control said process, said apparatus using for a determination of an on-off actuating signal a prediction of a process output sequence over several future sampling intervals as a response to a possible process input sequence that is applied to a discrete-time linear process model, and estimating and updating in every sampling interval parameters of a process model by means of a parameter estimation means in order to adapt the parameters to the process to be controlled, even when the process behavior changes, said apparatus having a device to input and change a setpoint as well as a measuring device for a periodic measurement of the process output, characterized in that it comprises:

two alternatively working first and second control means, said first control means being active in a stationary phase of the process and said second control means being active in a start-up phase of the process or after setpoint changes, each of said control means operating differently to produce control signals for said actuator, and switching means which activates one or the other of said control means in dependence of the result of a measurement of the process output and a current setpoint, said actuator being controlled by the control means which is activated by the switching means.

2. An apparatus as claimed in claim 1, wherein said switching means activates the second control means if the process has to be started or has to follow a setpoint change and activates the first control means if the process is run in the stationary phase.

3. An apparatus as claimed in claim 1, wherein said two control means are provided with informtion about the process by means of a common parameter estimation means.

4. An apparatus as claimed in claim 1, wherein said first control means predicts all possible $2^R$ future process output sequences, wherein the prediction of the process output sequence on the basis of a certain process input sequence is made by reusing the prediction of a portion of the process output sequence made on the basis of at least another process input sequence.

5. An apparatus as claimed in claim 1, wherein said first control means decouples a prediction time from a sampling time by dividing each discrete-time prediction step into a prefixed number of sampling intervals.

6. An apparatus as claimed in claim 1, wherein a determination of an evaluation parameter for each predicted process output and a resulting selection of the actuating signal for a next sampling interval is carried out together with the prediction.

7. An apparatus as claimed in claim 1, wherein the second control means predicts an extremal point of a process input sequence within which only one switching of an actuating signal occurs, the switching occurring after a first sampling interval of said process input sequence within which only one switching of an actuating signal occurs.

8. An apparatus as claimed in claim 7, wherein the actuating signal for a next sampling interval is taken from the said process input sequence within which only one switching of an actuating signal occurs, if a system deviation in the extremal point of the future process output sequence is of such a nature that no overshooting of the process output occurs.

9. An apparatus as claimed in claim 7, wherein, when process output overshooting occurs, the actuating signal is taken for the next sampling interval that results from a switching of the actuating signal to its counteracting level that is for the first sampling interval of the said process input sequence within which only one switching of an actuating signal occurs.

10. An apparatus as claimed in claim 7, wherein a prediction time is determined in such a manner that a time available within one sampling interval is used entirely for determining the actuating signal to be applied in the next sampling interval.

11. An apparatus as claimed in claim 1, further comprising a limit supervisory control means for turning off the active control means to switch the actuating signal of the process off or on if the process output exceeds the preselected upper or lower limit of the process output, respectively.

12. An apparatus as claimed in claim 1, further comprising manually operable limit supervisory control means for controlling the process by means of the actuator in such a way that the parameter estimation means yields a process model which can be used for later adaptive control.

13. An arrangement as claimed in claim 1, wherein the actuator is used synchronously with the measuring device.

14. An apparatus used in the transient phase of a process to be controlled comprising:
   means for generating a process input sequence within which only one switching of an actuating signal occurs, the switching occurring after a first sampling interval of the process input sequence,
   means for predicting a process output sequence over a number of future sampling intervals as a response to the process input sequence generated that is applied to a discrete-time linear process model, and further predicting the extremal point of the process output sequence, and
   means for selecting an actuating signal for the next sampling interval from the process input sequence generated, if a system deviation in the extremal point of the future process output sequence is of such a nature that no overshooting of the process output occurs, and for selecting, where overshooting of a process occurs, an actuating signal for the next sampling interval that results from a switching of such actuating signal to its counteracting level that is for the first sampling interval of the process input sequence generated.

15. A method of operating an apparatus for a discrete-time adaptive on-off switching control of a continuous-time process by means of a binary switching actuator producing two levels of actuating switching signals to on-off control said process, said apparatus using for a determination of an on-off actuating signal a prediction of a process output sequence over several future sampling intervals as a response to a possible process input sequence that is applied to a discrete-time linear process model, and estimating and updating in every sampling interval parameters of a process model by means of a parameter estimation means in order to adapt the parameters to the process to be controlled, even when the process behavior changes, said apparatus having a device to input and change a setpoint as well as a measuring device for a periodic measurement of the process output, said method comprising:
   predicting in a stationary phase all possible $2^R$ future process output sequences and predicting in a transient phase an extremal point of one future process output sequence which is caused by a process input sequence within which only one switching of an actuating signal occurs, the switching occurring after a first sampling interval of said process input sequence, within which only one switching of an actuating signal occurs,
   selecting one or the other prediction in dependence of the result of the measurement of the process output and a current input setpoint, and
   actuating the actuator in a next sampling interval based on a switching level produced from said one or the other prediction.

* * * * *